United States Patent [19]

Jaquette et al.

[11] Patent Number: 5,265,085
[45] Date of Patent: Nov. 23, 1993

[54] SIMULTANEOUS MO AND ROM OPTICAL DISK SIGNAL DETECTION

[75] Inventors: Glen A. Jaquette; Morovat Tayefeh, both of Tucson, Ariz.

[73] Assignee: International Business Machines, Armonk, N.Y.

[21] Appl. No.: 898,551

[22] Filed: Jun. 15, 1992

[51] Int. Cl.$^5$ .................. G11B 11/12; G11B 13/04
[52] U.S. Cl. ...................................... 369/99; 369/124; 369/44.35; 369/44.29; 360/114
[58] Field of Search .................. 369/99, 107, 122, 124, 369/126, 134, 43, 44.14, 44.25, 44.26, 44.29, 44.35, 44.11, 44.27; 360/114

[56] References Cited

U.S. PATENT DOCUMENTS

| | | | |
|---|---|---|---|
| 4,764,911 | 8/1988 | Morota et al. | 369/44.29 |
| 4,807,210 | 2/1989 | Kaku et al. | 369/44 |
| 4,833,662 | 5/1989 | Yoda | 369/124 |
| 4,847,824 | 7/1989 | Davie | 369/124 |
| 4,858,218 | 8/1989 | Takagi et al. | 369/44 |
| 4,924,447 | 5/1990 | Fuji et al. | 369/124 |
| 4,926,408 | 5/1990 | Murakami et al. | 360/114 |
| 4,941,139 | 7/1990 | Kulakowski et al. | 369/54 |
| 4,945,527 | 7/1990 | Sunagawa | 369/44.11 |
| 4,951,274 | 8/1990 | Iwanaga et al. | 369/44.11 |
| 4,964,110 | 10/1990 | Horimai et al. | 369/44.29 |
| 5,073,880 | 12/1991 | Maeda et al. | 369/44.26 |
| 5,161,135 | 11/1992 | Saito et al. | 369/124 |

Primary Examiner—Paul M. Dzierzynski
Assistant Examiner—Don Wong
Attorney, Agent, or Firm—Greenlee and Winner

[57] ABSTRACT

A circuit for simultaneously detecting both MO and ROM signals reflected from an optical disk so that both signals are present and useable without switching from one to the other. The circuit eliminates switching time and switching transients. Two photodetectors are arranged to sense P and S components of polarized light in order to stimulate a differential amplifier and produce an output representative of MO recorded data. A second amplifier is connected to at least one of the photodetectors to produce an output representative of ROM recorded data and also representative of defects in the MO portion of the optical disk.

27 Claims, 4 Drawing Sheets

SIMULTANEOUS MO AND ROM OPTICAL DISK SIGNAL DETECTION

This invention relates to a detection and amplification circuit capable of simultaneously receiving both a magneto-optic (MO) signal and a read-only (ROM) signal reflected from an optical disk and simultaneously amplifying both signals.

BACKGROUND OF THE INVENTION

Optical disk devices are used for the storage of computer-prepared data and have recognized value in their ability to store large quantities of data. The media for use in such devices is reactive to bursts of light, such as may be produced by the rapid switching of a semi-conductor laser. In order to write data on optical media, the laser power must be controlled at a fairly high power level, in order that the media can be altered in accordance with digits of data. In reading the data back, the laser power level is controlled to a lower level so that the media is not altered by the laser beam but the reflected light indicates the presence or absence of media alterations, that is, digits of data.

Optical media is of two general types, media which can be written only once and media which can be written, erased, and written again. Write-once media (WORM) is permanently altered when write power levels are produced by the laser beam. Erasable media, such as magneto-optic (MO) media, is not permanently altered when data is written. In the MO media, the magnetic orientation of the reactive material is altered in the writing process, and in the erasing process, the magnetic orientation is recorded.

When reading MO data from an optical disk, the remanent magnetization of one or the other polarity rotates the linear polarization of a reflected light beam creating P and S polarization components. By detecting these components of the light beam, an MO data signal is generated.

To readback data contained on write-once media, the reflected light beam intensity is modulated by the permanent condition of the disk. By detecting the intensity of the reflected light beam, a ROM signal is generated in accordance with the WORM data.

In operating an optical disk system, it is necessary to identify the particular sector and track upon which the laser beam is directed. That identification information is included in a sector header and stamped onto the disk itself. The user area, that is the data area, may be either write-once or erasable, but the sector header will always be permanent. Thus, even when writing or reading MO media, it is necessary to generate non-MO signals, ROM signals, from a sector header area.

In the writable region used for MO customer data, the readback signal is detected differentially for the best signal to noise ratio. Each component of the polarized light, P and S, is focused on a separate photodetector. The MO signal is the difference current or voltage signal generated by the polarized P and S light signals impinging on each detector. One technique for generating the difference signal is to amplify each photocurrent by a current or voltage amplifier and then take the difference for MO signal detection. For generating a ROM signal, the output of either amplifier or the sum signal of both amplifiers can be used.

For MO optical disks, as data density and the readback speed increase it becomes difficult to switch from reading the reflectivity (ROM) signal from the sector header to the detection of MO signals in the data area without encountering significant noise when reading the first few digits of the data area. Similarly, when switching from the data area to the next sector header, the switching time and the transients resulting from the switch create excessive noise when attempting to read the sector header. In order to accommodate the increased speed and data densities required for optical disks used in computer storage applications, the detection circuit of the instant invention has been developed to eliminate switching times and transients resulting from switching.

SUMMARY OF THE INVENTION

Briefly stated, this invention provides first and second photodetectors arranged to receive light reflected from the recording surface of an MO optical disk and optically divided into two orthogonal polarization states (e.g., P and S). The photodetectors are connected to allow amplification of the difference in photocurrent to produce an output signal representative of the polarization of the reflected light beam which has been polarization rotated by magnetic domains of an MO recording surface in accordance with the Kerr effect. One of the two photodetectors is also connected to a second amplifier for amplification of the total photocurrent through that photodetector for producing a signal representative of the total light intensity received by that photodetector. The signal from the second amplifier can then be used itself or processed through a summing circuit to remove the difference current component (represented by the output of the first amplifier) to give a signal representative of the intensity of the light beam reflected from the disk in order to provide a signal representative of data which intensity modulates the laser beam (such as ablative WORM and embossed sector IDs).

BRIEF DESCRIPTION OF THE DRAWING

The invention is set forth in detail below with reference to the accompanying drawing, a brief description of which follows.

DETAILED DESCRIPTION

Figure 1:
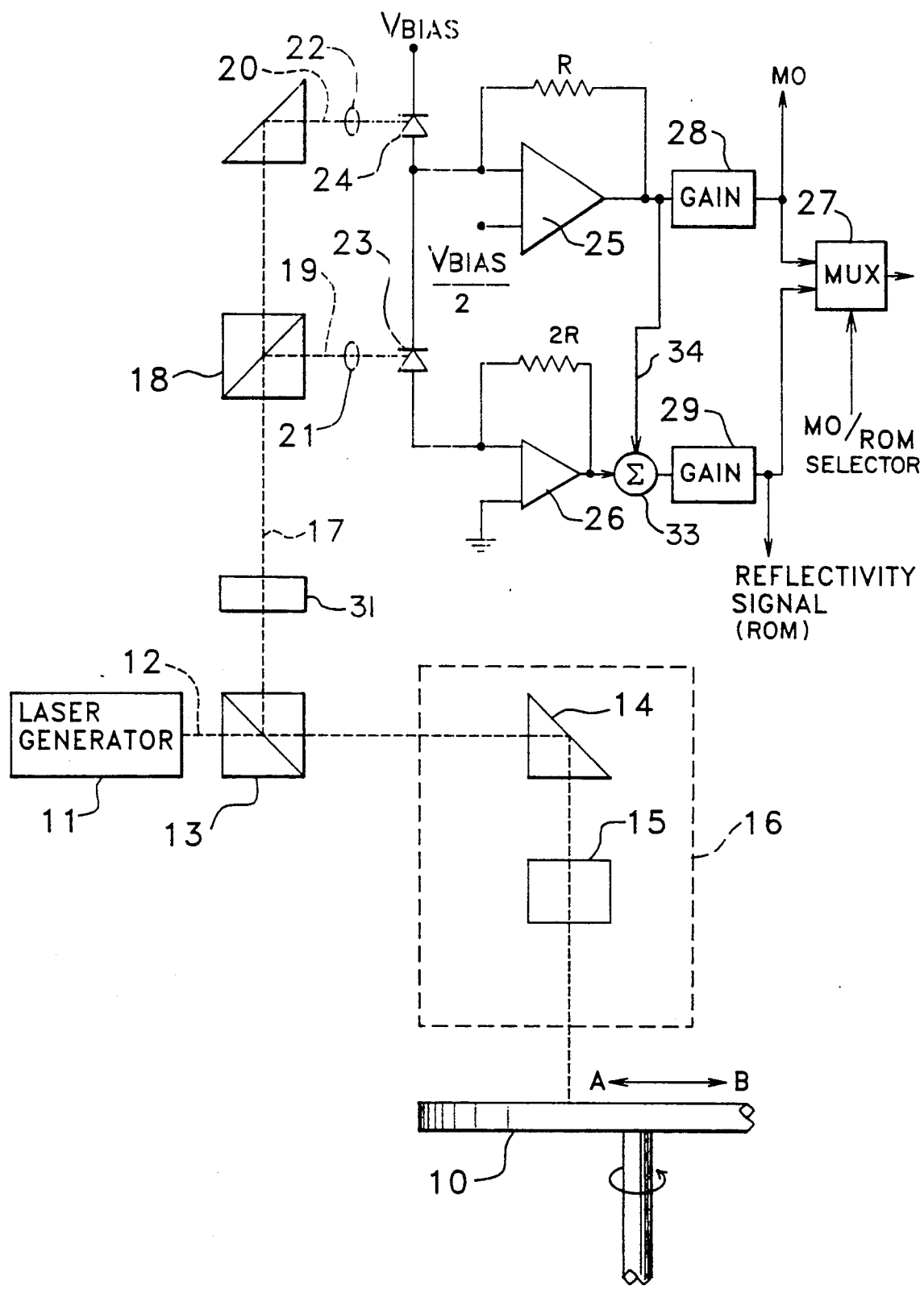
FIG. 1 shows the detection and amplification circuit of the instant invention together with a typical optical system for writing and reading optical disk media.

With reference to the drawing, like numbers indicate like parts and structural features in the various figures.

FIG. 1 shows an MO optical disk 10 mounted for rotation in an optical disk playback/recorder, the mechanical details of which are not shown. FIG. 1 shows a laser generator assembly 11 producing a polarized light beam over light path 12 to an optical system which includes a beam splitter 13. The portion of the light transmitted by the beam splitter 13 is reflected by prism 14 and refracted by objective lens 15 to the optical disk 10. Note that prism 14 and lens 15 are included in a movable optical head 16 which can be positioned along the surface of disk 10 in order to read or write to any track on the surface of the disk.

When reading data on the optical disk, light is reflected back from the disk through lens 15 and prism 14 to beam splitter 13 for reflection through optical element 31 (quarter waveplate) along light path 17 to polarizing beam splitter 18. Optical element 31 balances the intensity of the two orthogonal polarization states of the light so that polarizing beam splitter 18 splits the beam into two beams, 19 and 20, of orthogonal polarizations, P and S, but substantially equal amplitudes (when no Kerr rotation has been effected by the media during reflection). These beams are focused by lenses 21 and 22 respectively, onto photodetectors 23 and 24. Kerr rotation of the reflected light effected by magnetic domains of MO media causes a change in the balance between the two beams, 19 and 20, so that the magnetic orientation of the media is represented by the balance in light beam amplitudes. The light amplitudes of beams 19 and 20 are sensed by photodetection and the difference in intensity between the two beams is amplified to produce an MO signal which is of a first value for a first magnetic domain orientation representing a "zero" bit, and is of a second value for a reverse magnetic domain orientation representing a "one" bit. In that manner, light reflected from an MO optical disk is separated into its components in order that the light provide a description of the data on the disk.

When the light beam impinging on the magneto-optic disk strikes the embossed header, or ROM portion of the disk, the light does not experience a rotation in polarization upon reflection, but instead the intensity of the light is modulated in accordance with the data inscribed permanently into the sector header. The intensity modulated beam is reflected back through the optical head 16 to the beam splitter 13 and optical element 31 along light path 17 to polarizing beam splitter 18. In this case, the beam splitting effected by polarizing beam splitter 18 is not affected by intensity modulation of the data and therefor the difference between the amplitudes of the two beams, 19 and 20, is substantially zero. Therefore, in order to read the intensity modulated signal from the non-MO portion of disk 10, the output of one or the other of the photodetectors 23 or 24, or the summation the two, can be selected. Since the beam splitter 18 divides the ROM signal in a substantially equal manner between beams 19 and 20, photodetectors 23 and 24 each sense about one-half of the total ROM signal. The circuit arrangement shown in FIG. 1 utilizes the ROM output of photodetector 23; the circuit arrangement shown in FIG. 5 uses the ROM output of photodetector 24; and the circuit arrangement shown in FIG. 6 uses the ROM output of both photodetectors.

Figure 3:
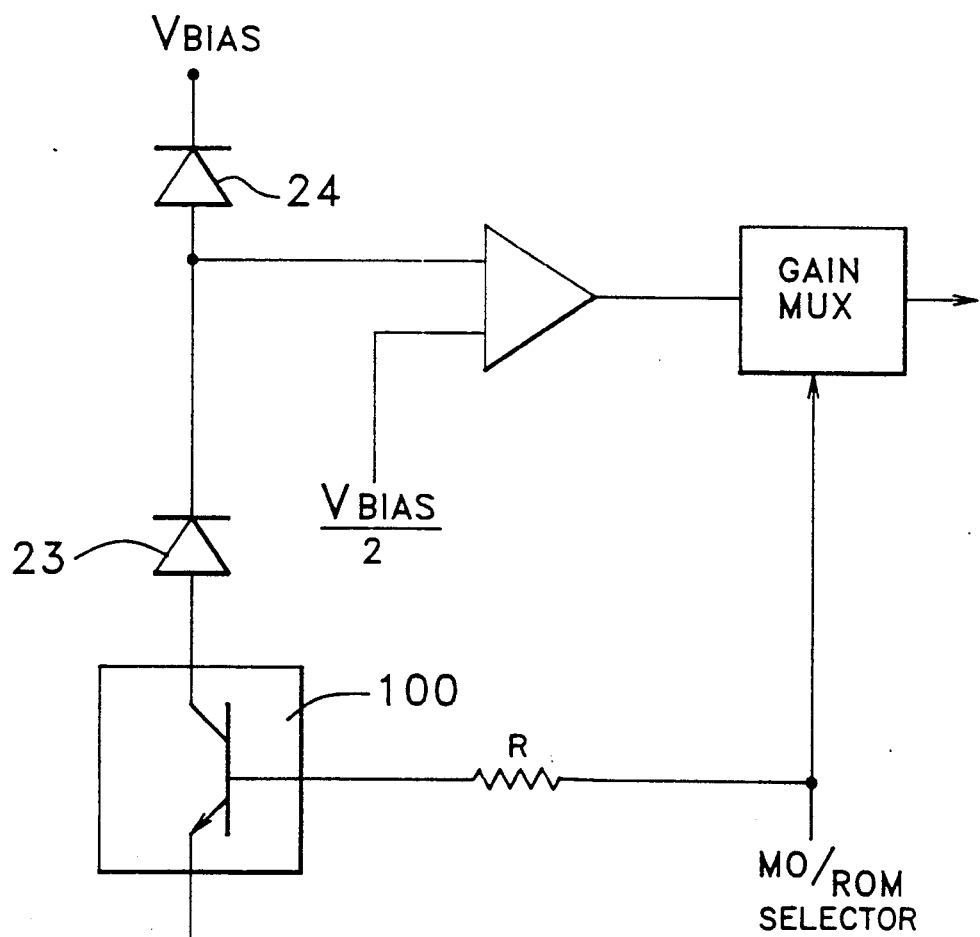
FIG. 3 shows a prior art circuit for switching between MO and ROM signals.

FIG. 3 shows a prior art technique for accomplishing the detection of both MO and ROM signals by providing a circuit with a switch 100. Switch 100 operates to allow a signal from photodetector 23 to function during MO signal detection, but switches photodetector 23 out of the circuit when it is desired to read the reflectivity (ROM) signal from photodetector 24. Since the circuit shown in FIG. 3 requires a switching operation, the time associated with the switching operation together with transients which develop as a result of switching, create noise in the detected signal so that a gap period must be provided long enough in duration to enable the circuit to stabilize before attempting to read data.

In the circuit of this invention, as shown in FIG. 1, the anode of photodetector 24 and the cathode of photodetector 23 are connected to a transimpedance amplifier 25. The anode of photodetector 23 is connected to a second transimpedance amplifier 26. When reading a differential MO signal, the output of amplifier 25 is provided through gain circuit 28 and multiplexor 27 to data detection circuits (not shown). When reading the ROM or reflectivity signal, the output of transimpedance amplifier 26 is summed with the output of transimpedance amplifier 25 by providing line 34 and summing circuit 33 for cancellation of any difference (MO) signal, thereby transferring the ROM signal through gain circuit 29 and multiplexor circuit 27 to data detection circuits. The ROM signal at the output of gain circuit 29 is available at all times and thereby allows continuous monitoring for disk format synchronization features such as the sector mark. As a consequence of the circuit shown in FIG. 1, it is possible to multiplex between MO and ROM readback signals with minimal switching transients enabling use of common data detection circuitry, while simultaneously providing a continuous ROM signal for detection of disk format features such as the sector mark and to allow detection of defects in the MO portion of the disk.

In the circuit of FIG. 1 the use of line 34 and summing circuit 33 is optional. Cancellation of the difference signal may not be important in many applications since that signal is small compared to the magnitude of the reflectivity signal, and therefore the ROM signal is present with relatively minor degradation in magnitude if the summing circuit 33 is not used.

Figure 2:
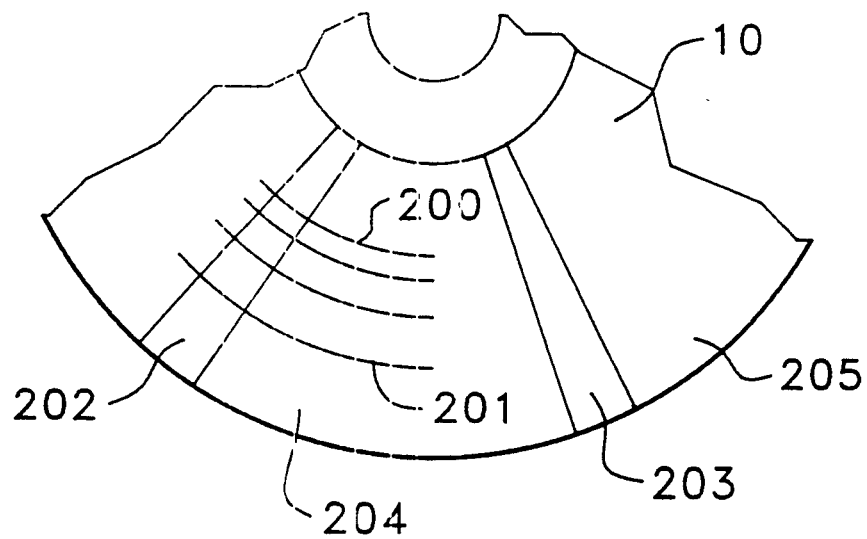
FIG. 2 is a schematic representation of tracks and sector headers on a typical optical disk for use with the device of FIG. 1.

FIG. 2 is a schematic representation of a portion of the surface of disk 10 and shows various tracks 201 on the surface of the disk, together with sector header regions 202 and 203, which are situated between user areas 204 and 205. For an MO disk, the magneto-optic region, that is the erasable region, is the user areas 204 and 205. As discussed above, the sector header regions 202 and 203 are permanently inscribed with data which identify the particular track and sector and with the sector mark which can be used to synchronize the detection circuits with the format fields of the disk.

Note that in the operation of the circuit of FIG. 1, photodetector 23 is not switched on and off as it is in the circuit of FIG. 3. Therefore, the switching time is eliminated as are switching transients. The transimpedance amplifier 26 amplifies the photocurrent generated by photodiode 23, thus providing the reflectivity signal of the intensity modulated portion of the disk 10. The ROM signal is multiplexed into the detection channel at multiplexor 27. Also, the output of the gain stage 29 can be used for defect detection in the MO region without any mode switching since the ROM (reflectivity) signal is present while MO data is being read. The circuit of FIG. 1 provides for a much improved signal to noise ratio for both the MO and the ROM signals relative to the circuit of FIG. 3.

Figure 4:
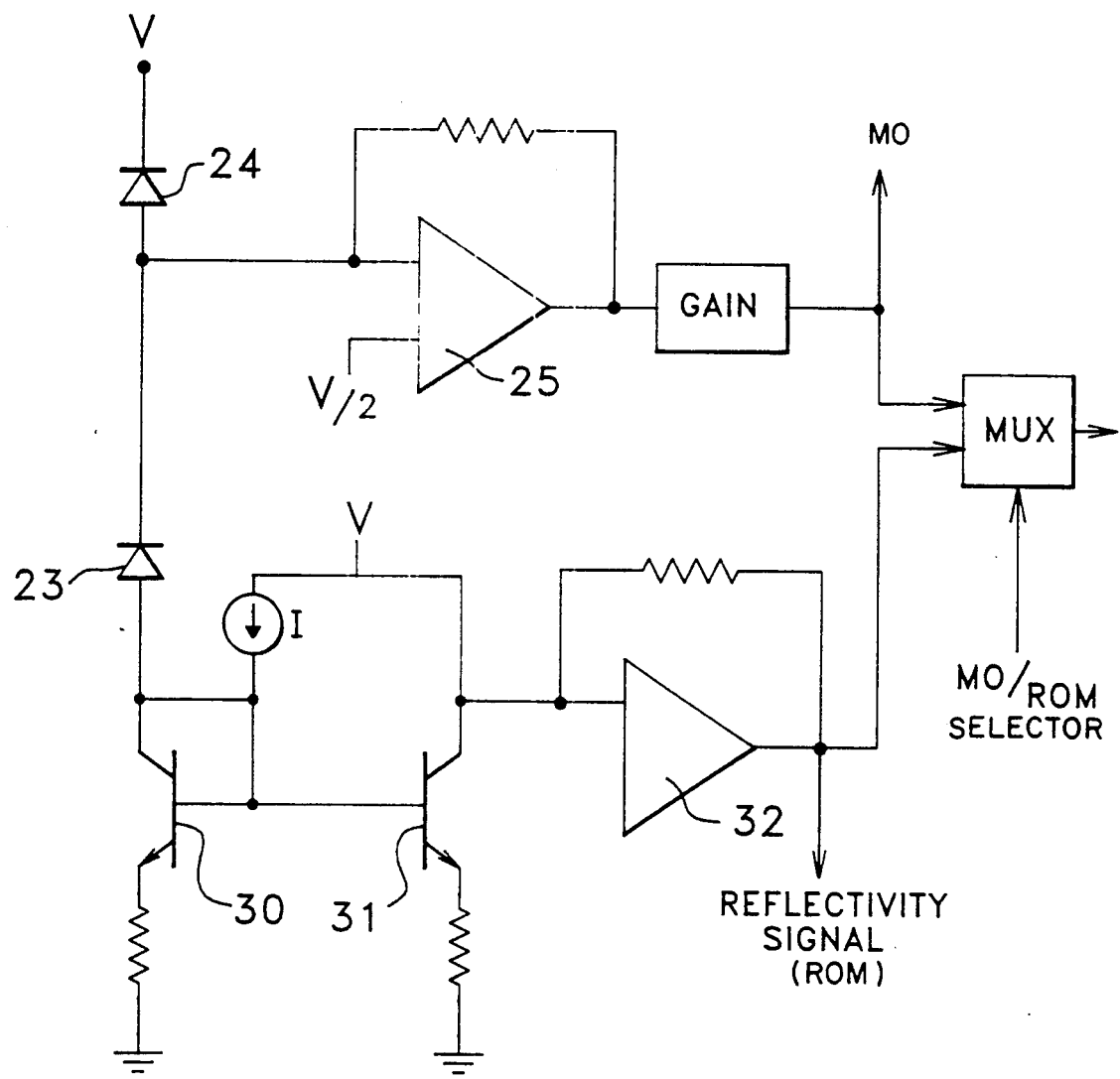
FIG. 4 is an alternative detection and amplification circuit according to the instant invention.

An alternative implementation of the invention is shown in FIG. 4. Transistors 30 and 31 are arranged in a current mirror configuration with amplifier 32 providing a reflectivity signal for the intensity modulated portion of disk 10. The MO signal is passed through the differential transimpedance amplifier 25 as in FIG. 1. The circuit of FIG. 4 also eliminates switching and the transients which accompany switching, and produces the simultaneous generation of both MO and ROM signals. A summing circuit can be added to FIG. 4 in the manner shown in FIG. 1 (summing circuit 33 and line 34).

Figure 5:
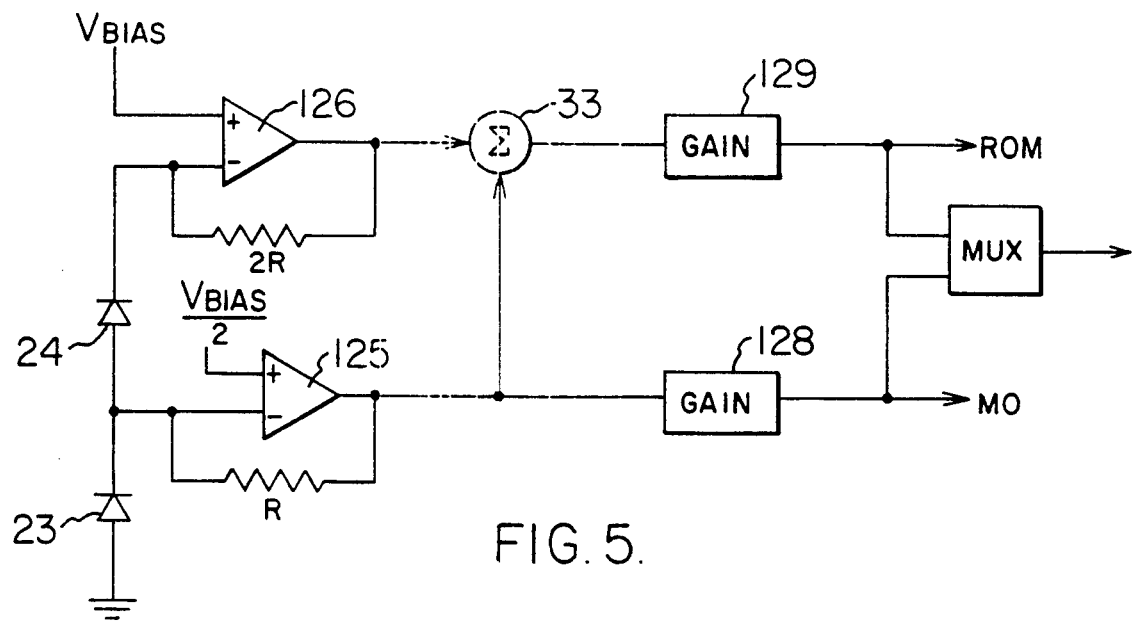
FIG. 5 shows another alternative detection and amplification circuit according to the instant invention.

FIG. 5 illustrates another alternative implementation of the invention. Transimpedance amplifier 125 is used to amplify the difference signal from photodetectors 23 and 24 and thereby provide an MO signal from gain circuit 128 in the manner described above with reference to FIG. 1. In FIG. 5, transimpedance amplifier 126 is connected to the cathode of detector 24. The output of amplifier 126 is connected to gain circuit 129 to produce the ROM signal. A summing circuit 33 can be added to the circuit of FIG. 5 if desired, in the manner shown in FIG. 1.

Figure 6:
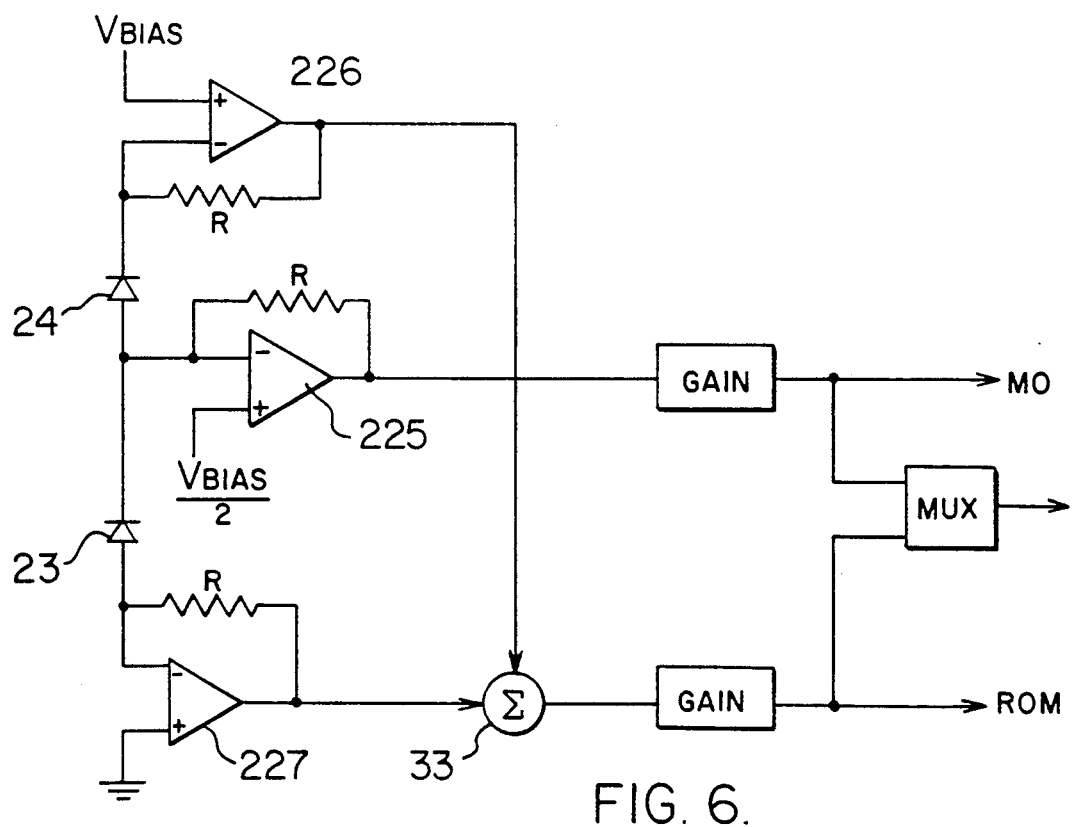
FIG. 6 shows still another alternative detection and amplification circuit according to the instant invention.

FIG. 6 is a diagram of another alternative implementation and provides for the use of the entire ROM signal. Photodetector 24 is connected to difference amplifier 225 and to amplifier 226. Photodetector 23 is connected to difference amplifier 225 and to amplifier 227. The MO signal is produced by amplifier 225 as discussed above with reference to FIG. 1. The ROM signal is produced by adding together the output of amplifiers 226 and 227. Once again, the summing circuit 33 can be used to delete the MO component of the ROM output signal if desired, in the manner shown in FIG. 1.

The inventive circuit described herein is illustrated for use with MO disks which include a ROM portion. The circuit is also of value for playback/recorder devices capable of utilizing both write-once and erasable optical disks.

While the invention has been described with respect to specific embodiments, it will be understood by those skilled in the art that various changes in form and details may be made therein without departing from the spirit and scope of the invention which receives definition in the following claims.

What is claimed is:

1. An optical disk drive apparatus including a magneto-optic (MO) optical disk, a laser generator, an optical system for focusing light output from said laser generator on said optical disk, said system also conducting light reflected from said optical disk to components for separately producing first and second polarized light signals both of which can be intensity modulated by a reflectivity signal from disk defects or from a ROM portion of said disk, a light detector circuit capable of receiving said polarized light signals and simultaneously producing electrical signals corresponding to MO output and reflectivity (ROM) output comprising;
a first photodetector optically connected to receive said first polarized signal from said optical system;
a second photodetector optically connected to receive said second polarized signal from said optical system;
a first amplifying means electrically connected to said first photodetector and to said second photodetector for producing an MO signal;
a second amplifying means electrically connected to at least one of said photodetectors for producing a ROM signal;
whereby both MO and ROM signals are simultaneously available.

2. The apparatus of claim 1 wherein,
said first and said second photodetectors both have an anode and a cathode, the anode of said first photodetector connected to said first amplifying means and the cathode of said second photodetector also connected to said first amplifying means for producing said MO signal; and
said second amplifying means connected to the anode of said second photodetector for producing said ROM signal.

3. The apparatus of claim 1 wherein,
said first and said second photodetectors both have an anode and a cathode, the anode of said first photodetector connected to said first amplifying means and the cathode of said second photodetector also connected to said first amplifying means for producing said MO signal; and
said second amplifying means connected to the cathode of said first photodetector for producing said ROM signal.

4. The apparatus of claim 1 wherein said second amplifying means includes a first amplifier, the input of which is connected to said first photodetector and a second amplifier, the input of which is connected to said second photodetector, the output signals of said first and second amplifiers connected together to produce said ROM signal.

5. The apparatus of claim 2 further including a summing circuit connected to receive and sum the output signals of said first and second amplifying means.

6. The apparatus of claim 3 further including a summing circuit connected to receive and sum the output signals of said first and second amplifying means.

7. The apparatus of claim 4 further including a summing circuit connected to receive and sum the output signals of said first and second amplifying means.

8. The apparatus of claim 1 wherein both said first amplifying means and said second amplifying means include transimpedance amplifiers.

9. The apparatus of claim 2 wherein both said first amplifying means and said second amplifying means include transimpedance amplifiers.

10. The apparatus of claim 3 wherein both said first amplifying means and said second amplifying means include transimpedance amplifiers.

11. The apparatus of claim 4 wherein both said first amplifying means and said second amplifying means include transimpedance amplifiers.

12. The apparatus of claim 2 further including current mirror means connected between said anode of said second photodetector and said second amplifying means.

13. The apparatus of claim 12 wherein said current mirror means includes two common emitter transistors connected base to base, the collector of one said transistors connected to said anode of said second photodetector and the collector of the other of said transistors connected to said second amplifying means.

14. An optical disk drive apparatus capable of reading data from an erasable portion of a magneto-optic (MO) optical disk and from a permanently inscribed (ROM) portion of said optical disk, said apparatus comprising;
a laser generator for producing light;
an optical system for receiving light produced by said laser generator and conducting said light to said disk, said optical system for receiving light reflected from said optical disk and conducting said reflected light to components for separating first and second polarized light signals reflected from said erasable portion and directing said separated light to first and second photodetectors respectively, said first and second light signals intensity modulated by a reflectivity signal reflected from said permanently inscribed portion of said optical disk;

a first amplifying means connected to the anode of said first photodetector and to the cathode of said second photodetector for differentially amplifying the output of the two photodetectors to produce an MO signal;

a second amplifying means connected to the anode of said second photodetector for amplifying the output of said second photodetector to produce a ROM signal.

15. The apparatus of claim 14 wherein both said first amplifying means and said second amplifying means include transimpedance amplifiers.

16. The apparatus of claim 14 further including current mirror means connected between said anode of said second photodetector and said second amplifying means.

17. The apparatus of claim 16 wherein said current mirror means includes two common emitter transistors connected base to base, the collector of one said transistors connected to said anode of said second photodetector and the collector of the other of said transistors connected to said second amplifying means.

18. An optical disk apparatus comprising, a laser generator mounted within said apparatus;

an optical disk mounted within said apparatus;

an optical system for transmitting a beam produced by said laser generator to said optical disk and for transmitting a reflected beam from said optical disk to components within said system for polarizing and splitting said reflected beam into two orthogonal beams;

a first photodetector optically positioned to receive one of said orthogonal beams and for producing a first signal proportional thereto;

a second photodetector optically positioned to receive the other of said orthogonal beams and for producing a second signal proportional thereto;

a first amplifying means electrically connected to said first photodetector and to said second photodetector for producing a first output signal proportional to the difference of said first and said second signals;

a second amplifying means, the input of which is electrically connected to at least one of said photodetectors for producing a second output signal proportional to said input;

whereby said first output signal (MO) is indicative of the magnetic polarization of said disk and said second output signal (ROM) is indicative of the reflective intensity of said disk, said first and said second output signals produced for simultaneous detection.

19. The apparatus of claim 18 wherein, said first and said second photodetectors both have an anode and a cathode, the anode of said first photodetector connected to said first amplifying means and the cathode of said second photodetector also connected to said first amplifying means for producing said MO signal; and said second amplifying means connected to the anode of said second photodetector for producing said ROM signal.

20. The apparatus of claim 19 wherein both said first amplifying means and said second amplifying means include transimpedance amplifiers.

21. The apparatus of claim 20 further including a summing circuit connected to receive and sum the output signals of said first and second amplifying means.

22. The apparatus of claim 18 wherein, said first and said second photodetectors both have an anode and a cathode, the anode of said first photodetector connected to said first amplifying means and the cathode of said second photodetector also connected to said first amplifying means for producing said MO signal; and said second amplifying means connected to the cathode of said first photodetector for producing said ROM signal.

23. The apparatus of claim 22 wherein both said first amplifying means and said second amplifying means include transimpedance amplifiers.

24. The apparatus of claim 23 further including a summing circuit connected to receive and sum the output signals of said first and second amplifying means.

25. The apparatus of claim 18 wherein said second amplifying means includes a first amplifier, the input of which is connected to said first photodetector, a second amplifier, the input of which is connected to said second photodetector, and a summing circuit means for receiving the output signals of said first and second amplifiers to produce said ROM signal.

26. The apparatus of claim 25 wherein both said first amplifying means and said second amplifying means include transimpedance amplifiers.

27. The apparatus of claim 26 wherein said summing circuit means is connected to receive and sum the output signals of said first and second amplifying means.

* * * * *